US009236917B2

(12) United States Patent
Jeong et al.

(10) Patent No.: US 9,236,917 B2
(45) Date of Patent: Jan. 12, 2016

(54) COORDINATED COMMUNICATION IN COMMUNICATION SYSTEM (71) Applicant: Samsung Electronics Co., Ltd., Gyeonggi-do (KR)

(72) Inventors: Su-Ryong Jeong, Gyeonggi-do (KR); Hyun-Kyu Yu, Gyeonggi-do (KR); Jeong-Ho Park, Seoul (KR); Ji-Yun Seol, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 13/896,167

(22) Filed: May 16, 2013

(65) Prior Publication Data

US 2013/0308569 A1 Nov. 21, 2013

(30) Foreign Application Priority Data

May 16, 2012 (KR) .................. 10-2012-0051735

(51) Int. Cl.
*H04B 7/02* (2006.01)
(52) U.S. Cl.
CPC .................... *H04B 7/024* (2013.01)
(58) Field of Classification Search
USPC .................................... 370/310, 328, 329
See application file for complete search history.

(56) References Cited

U.S. PATENT DOCUMENTS

| 8,155,023 | B2 * | 4/2012 | Vedantham et al. | 370/252 |
| 8,467,801 | B2 * | 6/2013 | McCoy et al. | 455/450 |
| 8,755,806 | B2 * | 6/2014 | Shen et al. | 455/450 |
| 2005/0143072 | A1 * | 6/2005 | Yoon et al. | 455/436 |
| 2008/0318614 | A1 * | 12/2008 | Iizuka et al. | 455/522 |
| 2009/0046665 | A1 | 2/2009 | Robson et al. | |
| 2009/0285159 | A1 | 11/2009 | Rezaiifar et al. | |
| 2010/0067472 | A1 | 3/2010 | Ball et al. | |
| 2011/0077038 | A1 * | 3/2011 | Montojo et al. | 455/507 |
| 2011/0235602 | A1 | 9/2011 | Ji et al. | |
| 2011/0305195 | A1 * | 12/2011 | Forck et al. | 370/328 |
| 2012/0069825 | A1 * | 3/2012 | Ode et al. | 370/336 |
| 2012/0087440 | A1 * | 4/2012 | Guo | 375/295 |
| 2012/0088539 | A1 | 4/2012 | Jeong et al. | |
| 2012/0183093 | A1 * | 7/2012 | Zhu | 375/285 |
| 2013/0021929 | A1 * | 1/2013 | Kim | 370/252 |
| 2014/0016565 | A1 * | 1/2014 | Ode et al. | 370/328 |
| 2014/0112282 | A1 * | 4/2014 | Wijting et al. | 370/329 |
| 2014/0221037 | A1 * | 8/2014 | Hassett | 455/522 |

(Continued)

OTHER PUBLICATIONS

International Search Report dated Sep. 6, 2013 in connection with International Patent Application No. PCT/KR2013/004331, 3 pages.

(Continued)

*Primary Examiner* — Chi H Pham
*Assistant Examiner* — Robert Lopata (57) ABSTRACT

A method of supporting communication of a terminal in a first base station of a beamforming system is provided. The method includes determining an uplink control channel through which both the first base station and at least one second base station are able to receive signals, through cooperation with the at least one second base station, the first base station and the at least one second base station belonging to a cloud cell, and transmitting to the terminal information on the determined uplink control channel and frame information to establish relationships with the base stations included in the cloud cell for each transmit frame of a signal to be transmitted to the terminal from the base stations.

27 Claims, 8 Drawing Sheets

(56) References Cited

U.S. PATENT DOCUMENTS

2014/0226594 A1* 8/2014 Liu .............................. 370/329
2014/0247744 A1* 9/2014 Agiwal et al. ................ 370/252

OTHER PUBLICATIONS

Written Opinion of International Searching Authority dated Sep. 6, 2013 in connection with International Patent Application No. PCT/KR2013/004331, 7 pages.

* cited by examiner

COORDINATED COMMUNICATION IN COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application No. 10-2012-0051735 filed in the Korean Intellectual Property Office on May 16, 2012, the entire disclosure of which is incorporated herein by reference in its entirety.

TECHNICAL FIELD

The present disclosure relates generally to a communication system, and more particularly, to an apparatus and method for performing coordinated communication to increase communication efficiency and reliability in a beamforming system.

BACKGROUND

Communication systems have been developed to support higher data rate to meet the need for steadily increasing wireless data traffic. For example, fourth generation wireless communication systems has sought to develop technologies toward improving spectral efficiency to increase data rate.

Since such technologies are not enough to meet the need for soaring wireless data traffic, communication systems have been developed to secure a new frequency band. For example, since a wide frequency band is hardly secured below 10 GHz, communication at higher frequencies than 10 GHz is drawing attention as a future communication technology. However, the higher the transmission frequency for wireless communication, the shorter the propagation range, thus causing reduction of service coverage.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary object to provide an apparatus and method for efficiently performing beamforming to increase data rate in a communication system.

The present disclosure also provides an apparatus and method for performing coordinated communication to increase communication efficiency and reliability.

The present disclosure also provides an apparatus and method to guarantee smooth communication between a terminal and base stations.

In accordance with an aspect of a present disclosure, provided is a method of supporting communication of a terminal in a first base station of a beamforming system, the method including: determining an uplink control channel through which both the first base station and at least one second base station are able to receive signals, through cooperation with the at least one second base station, the first base station and the at least one second base station belonging to a cloud cell, and transmitting to the terminal information on the determined uplink control channel and frame information to establish relationships with the base stations included in the cloud cell for each transmit frame of a signal to be transmitted to the terminal from the base stations.

In accordance with another aspect of a present disclosure, provided is a method of supporting communication of a terminal in a first base station of a beamforming system, the method including determining an uplink control channel through which both the first base station and a second base station are able to receive signals, through cooperation with the second base station, the first base station and the second base station belonging to a cloud cell, receiving from the second base station frame information to establish relationships with the base stations included in the cloud cell for each transmit frame of a signal to be transmitted to the terminal from the base stations; and receiving a signal from the terminal through the determined uplink control channel.

In accordance with another aspect of a present disclosure, provided is a communication method in a terminal of a beamforming system, the method including receiving information on an uplink control channel through which both a first base station and at least one second base station are able to receive signals, which is determined through cooperation of the first base station and the at least one second base station, and frame information to establish relationships with the base stations for each receive frame of a signal to be received from any of the base stations, wherein the first base station and the at least one second base station belonging to a cloud cell.

In accordance with another aspect of a present disclosure, provided is a first base station for supporting communication of a terminal in a beamforming system, the first base station including: a transceiver for transmitting or receiving signals, and a controller for determining an uplink control channel through which both the first base station and at least one second base station are able to receive signals, through cooperation with the at least one second base station, the first base station and the at least one second base station belonging to a cloud cell, and for transmitting to the terminal information on the determined uplink control channel and frame information to establish relationships with the base stations included in the cloud cell for each transmit frame of a signal to be transmitted to the terminal from the base stations.

In accordance with another aspect of a present disclosure, provided is a first base station for supporting communication of a terminal in a beamforming system, the first base station including a transceiver for transmitting or receiving signals, and a controller for determining an uplink control channel through which both the first base station and at least one second base station are able to receive signals, through cooperation with the at least one second base station, the first base station and the at least one second base station belonging to a cloud cell, and controlling the transceiver to receive from the at least one second base station frame information to establish relationships with the base stations included in the cloud cell for each transmit frame of a signal to be transmitted to the terminal from the base stations and to receive signals from the terminal through the uplink control channel.

In accordance with another aspect of a present disclosure, provided is a communication terminal in a beamforming system, the terminal including a transceiver for transmitting or receiving signals; and a controller for controlling the transceiver to receive information on an uplink control channel through which both a first base station and at least one second base station are able to receive signals, which is determined through cooperation of the first base station and the at least one second base station, and frame information to establish relationships with the base stations for each receive frame of a signal to be received from any of the base stations, wherein the first base station and the at least one second base station belongs to a cloud cell.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless telecommunication technologies. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Beamforming is a technology to increase a radio propagation range, including transmit beamforming and receive beamforming. Interference is artificially suppressed by transmit and receive beamforming, thereby resulting in good signal-to-noise ratio of a received signal.

Transmit beamforming focuses the radio propagation range toward a particular direction using a set of multiple antennas called an antenna array whose element, i.e., each antenna is called an array element. Using the transmit beamforming not only increases the radio propagation range but also reduces interference with neighboring cells since signal intensity in other directions than the focused direction is weak.

The receive beamforming uses the antenna array on a receiver's side, focusing radio receivable area toward a particular direction, thereby increasing the radio reception range, and reducing the reception gain of a transmitted signal in other directions than the focused direction, thereby reducing interference with neighboring cells.

In a cloud cell, a terminal can access one or more base stations simultaneously and selectively transmit or receive a signal with one of the one or more base stations that provides better signal. In an example, Coordinated Multi Point (CoMP) of Long Term Evolution (LTE) system is a technique to implement the cloud cell where coordinated communication is performed using two or more base stations (or Access Points (APs)). In the cloud cell, one or more base stations (BSs) are associated with one another in relation to a terminal. Among the one or more BSs, a BS that takes a top priority in transmission of a control signal for the terminal is called a master BS and a BS that has a relatively lower priority is called a slave BS.

The cloud cell, which is distinguished from the existing cell that has a single BS, is a kind of virtual cell where one or more BSs cooperate to support communication for a terminal. It should be noted that an identifier of the cloud cell may or may not be the same as that of the master BS included in the cloud cell. Since one or more slave BSs included in the cloud cell may share information with one another through a prior cooperative process, they can figure out the identifier of the cloud cell, and identify the master BS through the identifier of the cloud cell.

Figure 1:
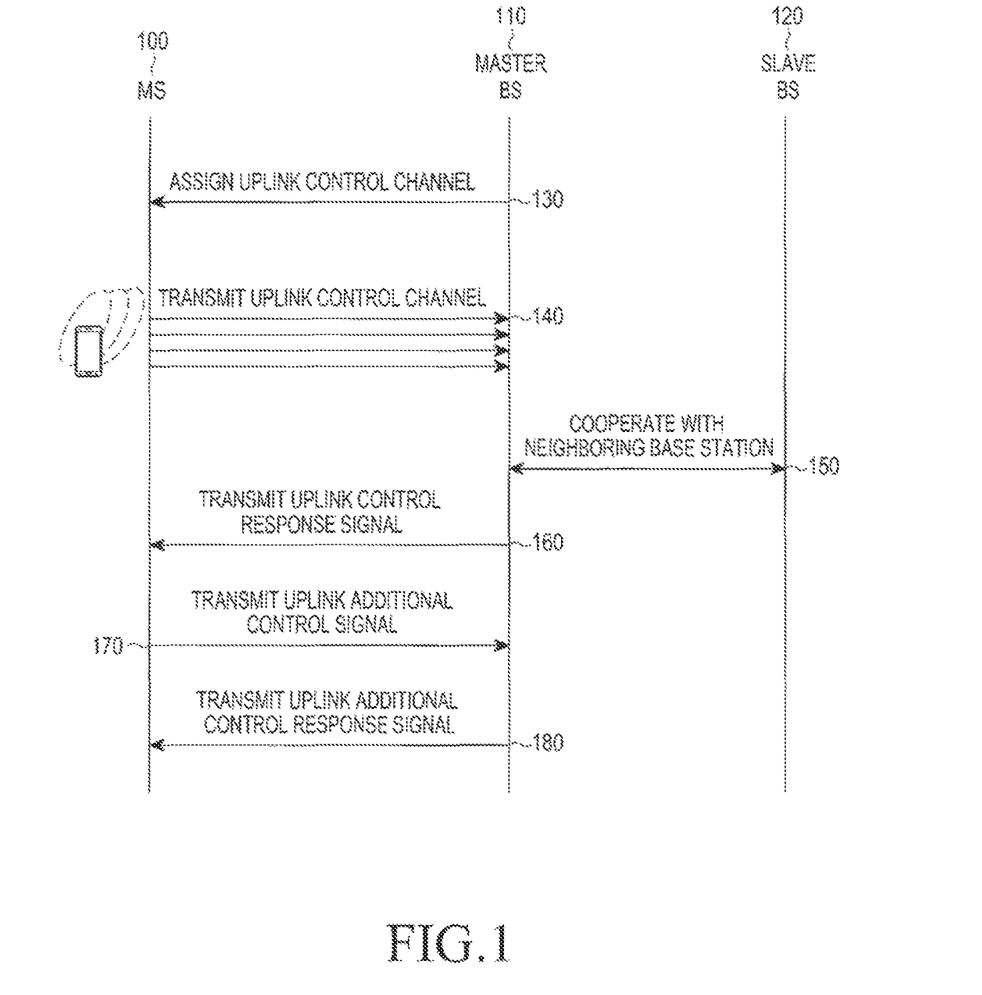
FIG. 1 illustrates a process of transmitting an uplink control signal for a terminal according to an embodiment of the present disclosure.
Figure 2:
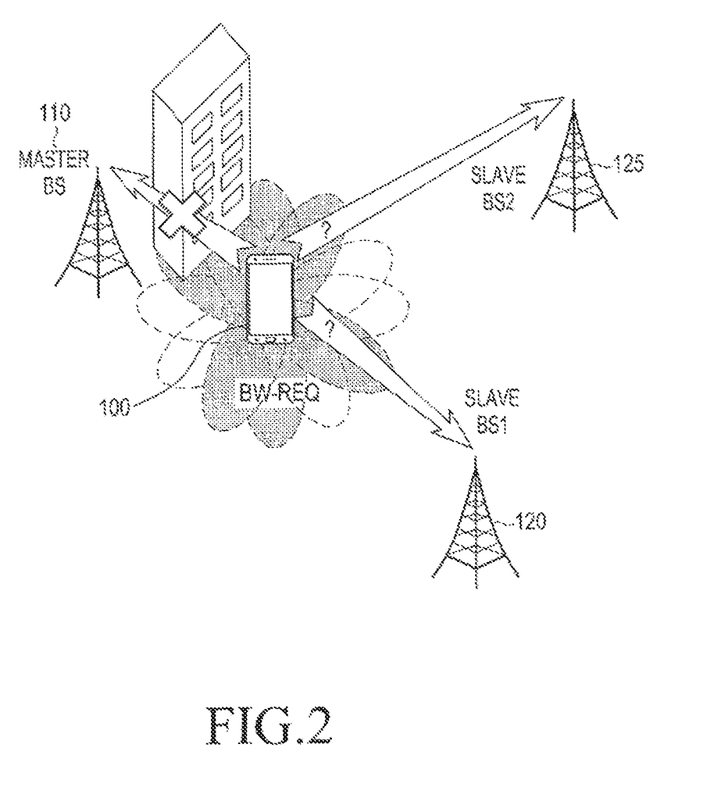
FIG. 2 illustrates a cloud cell according to an embodiment of the present disclosure.

FIGS. 1 and 2 are diagrams to explain a cloud cell according to an embodiment of the present disclosure. FIG. 1 illustrates an embodiment of a process of transmitting an uplink control signal for a terminal (or mobile station (MS)) 100. The process begins when a master BS 110 assigns an uplink control channel for the MS 100 in step 130. The uplink control channel can include a Bandwidth Request (BW-REQ) channel, an uplink (UL) sounding request channel, a handover request channel, and the like. The uplink control channel can be assigned to a resource dedicated to the MS 100, or a channel configured in a random access scheme in which transmission is determined by the needs of the MS 100 periodically or at a point in time.

The MS 100 transmits the uplink control signal to the master BS 110 on the assigned channel when needed in step 140. In this regard, if the master BS 110 has one or more receive beams, the MS 100 can repeatedly transmit a signal in question in a same transmit beam direction. Upon reception of the signal, the master BS 110 performs coordinated operations with a slave BS 120 to determine whether the master BS 110 or the neighboring slave BS 120 will control the terminal 100 in step 150.

The coordinated operations performed with a neighboring BS contribute to increasing transmission efficiency or communication reliability. For example, if the uplink control signal transmitted by the MS 100 is the BW-REQ signal, uplink transmission resources can be assigned by the master BS 110, but in a particular situation where the transmission efficiency is determined better if the slave BS 120 assigns the uplink transmission resources, the uplink transmission resources can be assigned by the slave BS 120.

After completing the coordinated operations, the master BS 110 transmits an uplink control response signal to the terminal 100 in step 160, and the uplink control response signal can include results of the cooperated operations. Alternatively, if the terminal 100 transmits (or requests) an uplink additional control signal (e.g., a bandwidth request header (BR-Header) signal) in step 170, the master BS 110 can transmit an uplink additional control response signal in step 180.

As described above, the process of transmitting and receiving the uplink control signal in the cloud cell in FIG. 1 has to include a step of communicating with the master BS 110 even though it is possible for the terminal 100 to communicate with one or more BSs simultaneously. This is because signaling between the master BS 110 and the terminal 100 is essential since the communication system needs to be operated by the specific system rules between transmitter and receiver.

Especially, if the MS 100 only has a receiving radio frequency (RF) module due to its hardware constraint, the MS 100 can communicate with only one BS at a time. Thus, when there are no rules determined on receive beamforming per receive frame, the MS 100 has to continuously perform the receive beamforming for the master BS 110 to achieve smooth transmission and reception signaling.

If an obstruction has occurred in the communication channel between the MS 100 and the master BS 110, as illustrated in FIG. 2, the MS 100 may not receive any control signal from the master BS 110 and thus is unable to communicate with slave BSs 120 and 125.

Figure 3:
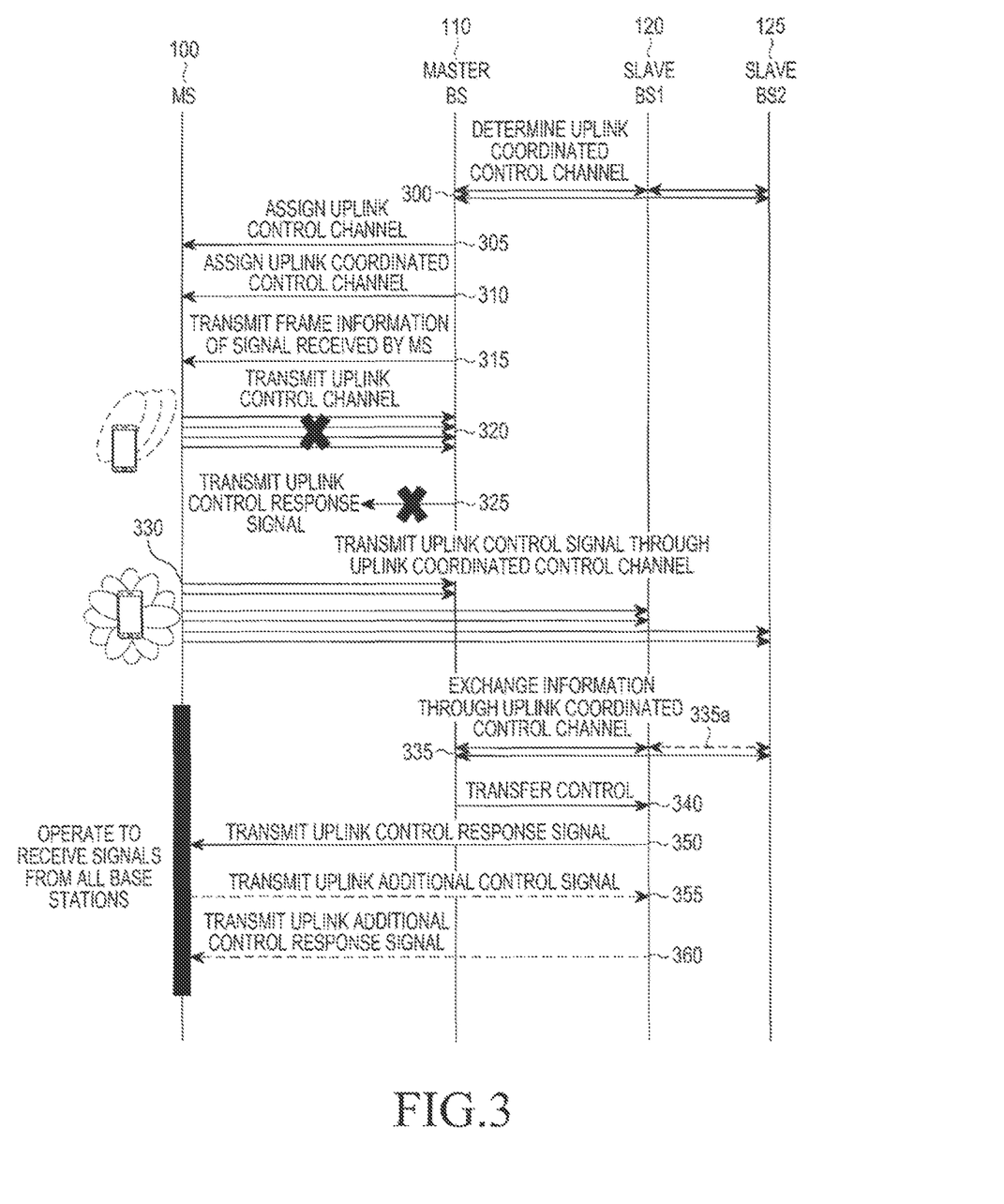
FIG. 3 illustrate a process of transmitting an uplink control signal for a terminal according to another embodiment of the present disclosure.
Figure 4:
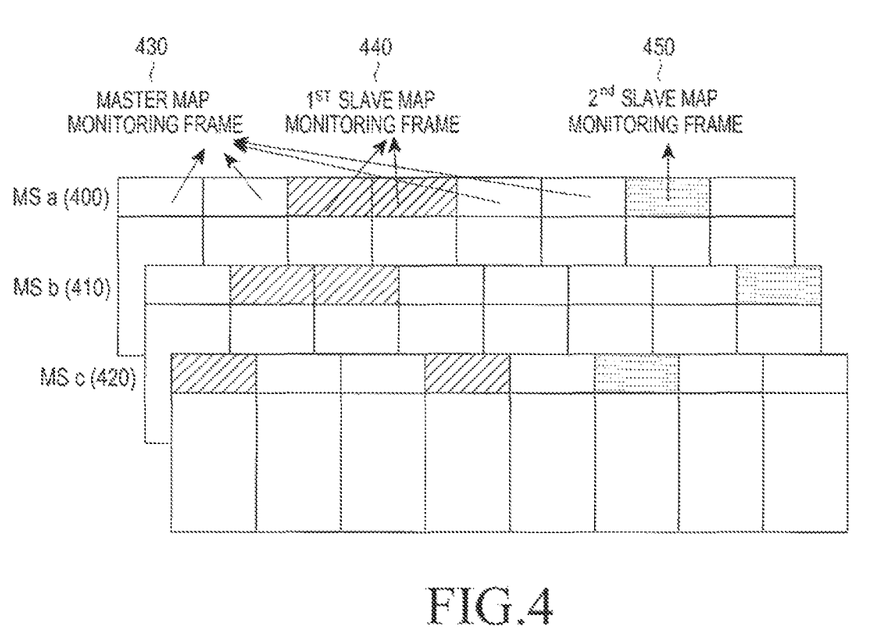
FIG. 4 illustrates frame structures of signals that each terminal receives in a cloud cell, according to an embodiment of the present disclosure.
Figure 5:
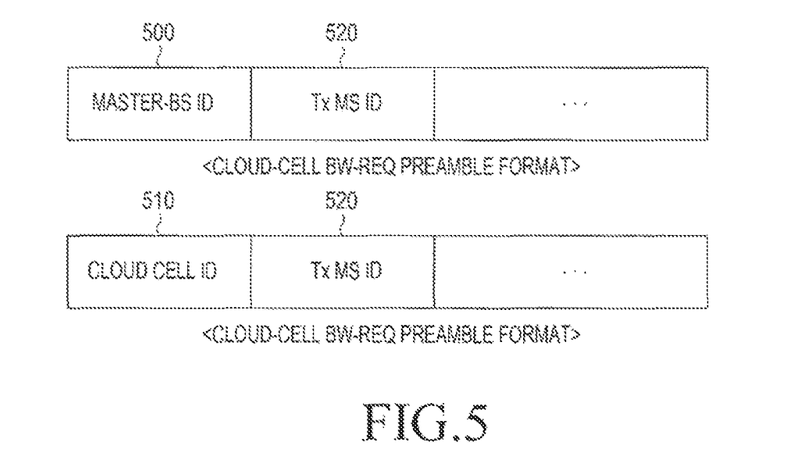
FIG. 5 illustrates preamble formats contained in a signal that a terminal transmits in a cloud cell according to an embodiment of the present disclosure.

FIGS. 3 to 5 are diagrams to explain a cloud cell, according to an embodiment of the present disclosure.

In the embodiment of the cloud cell, if the MS 100 may not receive any control signal from the master BS 110, the MS 100 is allowed to communicate with slave BSs 120 and 125.

Referring to FIG. 3, an uplink control channel is the BW-REQ channel through which the MS 100 requests uplink transmit resources. However, it should be appreciated that for all control signals the MS 100 tries to transmit to the master BS 110 at any time, a random access operation to resume communication, a periodic ranging operation for transmitting periodic uplink control/channel scan signal, an uplink sounding-request operations, a handover-request operation, and the like can be applied.

Referring to FIG. 3, the master BS 110 and the slave BSs 120 and 125 cooperate to determine an uplink coordinated control channel available for all the BSs 110, 120, and 125 to receive signals from the MS 100 in case of occurrence of communication interruption between the MS 100 and the master BS 10 in step 300. For the uplink coordinated control signal, the same resource area as used for the conventional control channel can be used, or a separate resource area can be assigned.

After determining the uplink coordinated control channel, the master BS 110 assigns an uplink control channel (e.g., BW-REQ channel) independently, and transmits information on the independent assignment of the uplink control channel in step 305. The master BS 110 transmits the information on the assignment of the uplink coordinated control channel to the MS 100 in step 310. Signals through the uplink control channel independently assigned by the master BS 110 are received only by the master BS 110, but signals through the uplink coordinated control channel determined through cooperation are received by both the master BS 110 and slave BSs 120 and 125. The information on assignment of the uplink coordinated control channel can be e.g., information to indicate which time resources (e.g., slots, subframes or frames) are assigned to the uplink coordinated control channel.

In order for the MS 100 that transmitted signals through the uplink coordinated control channel to any BSs 110, 120, and 125 in the cloud cell to receive a response signal even from other BSs 120 and 125 than the master BS 110, the MS 100 has to know to which BS each receive frame of its received signal is assigned. Accordingly, the master BS 110 transmits to the MS 100 frame information to establish relationships of the MS 100 with the master BS 110 and the slave BSs 120 and 125 for each receive frame of the signal to be received by the MS 100 in step 315. After transmitting a signal through the uplink coordinated control channel, the MS 100 performs receive beamforming to receive a response signal not only from the master BS 110 but also from the slave BSs 120 and 125, using the frame information received from the master BS 110.

Although, in the specification, the information on assignment of the uplink control channel, the information on assignment of the uplink coordinated control channel, and the frame information are transmitted separately in steps 305, 310, and 315, it should be noted that two or more pieces of the information can be transmitted together in parallel. For example, the two or more pieces of the information can be transmitted in a broadcast signal.

The frame information transmitted in step 315 is designed for the MS 100 to receive a response signal from the master BS 110 and the slave BSs 120 and 125 under a particular rule when the MS 100 may not simultaneously receive signals from multiple BSs due to its RF module constraint. Referring to FIG. 4, each of MS a 400, MS b 410, and MS c 420 in a cloud cell has a specific sequence of receiving control/response signals from the master BS 110 and the slave BSs 120 and 125, and receives a signal from each BS using an index or a detailed scheme with respect to the sequence. Referring to FIG. 4, frames that each of MS a 400, Ms b 410, and MS c 420 receives include a frame corresponding to the master MS 110, a frame 440 corresponding to the first slave BS 120, and a frame 450 corresponding to the second slave BS 125, and the frames 430 to 450 are different for each MS. The MS 100 that transmitted the uplink control signal through the uplink coordinated control channel tries to receive a response signal not only from the master BS 110 but also from the slave BSs 120 and 125 in the sequence specific for the MS 100.

The MS 100 in need for transmitting an uplink control signal transmits the uplink control signal to the master BS 110. If communication interruption occurs between the MS 100 and the master BS 110, i.e., if a transmit signal from the MS 100 fails to reach the master BS 110 in step 320 or if an uplink control response signal from the master BS 110 fails to deliver to the MS 100 in step 325, the MS 100 transmits the uplink control signal through the uplink coordinated control channel available for both the master BS 110 and slave BSs 120 and 125 in step 330. Although in step 330 of FIG. 3, the uplink control signal is transmitted on the uplink coordinated control channel in the sequence of the master BS 110, the first slave BS 120, and the second slave BS 125, it should be noted that the sequence can be illustrated merely for convenience of explanation but may be varied in different manner.

Unlike the step 320 where the MS 100 transmits the uplink control signal only to the master BS 110, the MS 100 transmits the uplink control signal all BSs 110, 120 and 125 in the cloud cell in step 330, and thus the MS 100 transmits the uplink control signal not only in the uplink transmit beamforming direction available for communication with the master BS 110 but also in all uplink transmit beamforming directions available for communication with the slave BSs 120 and 125. Alternatively, the MS 100 can transmit the uplink control signal in all transmit beamforming directions available for transmission. In the step 320, dotted beams illustrated to be in one direction, giving it an oval shape around a terminal represent that transmission of multiple array elements is performed in the uplink transmit beamforming direction available for transmission to the master BS 110, and in the step 330, beams illustrated to be radiating in all directions around a terminal represent that the MS 100 transmits the uplink control signal in all available transmit beamforming directions.

By doing this, the MS 100 can transmit the uplink control signal and receive the response signal not only to and from the master BS 110 but also to and from the slave BSs 120 and 125, and can request to establish a special purpose control channel to transmit a signal, such as BW-REQ preamble signal.

In the case the MS 100 transmits the uplink control signal only to the master BS 110, the uplink control signal does not need to contain separate information on a target base station, nor information on the master BS 110, information on the cloud cell, or information to estimate them unless the uplink coordinated control channel is determined through cooperation between the master BS 110 and the slave BSs 120 and 125. On the other hand, in the case the MS 100 transmits the uplink control signal through the uplink coordinated control channel, since a target base station to receive the uplink control signal may not necessarily be the master BS 110, the uplink control signal needs to contain information to identify the cloud cell the MS 100 belongs to or the master BS 110 in the cloud cell.

In an embodiment, as illustrated in FIG. 5, the BW-REQ preamble signal that the MS 100 sends on uplink can include an ID of the MS 520, an ID of the master BS of the MS 500 or an ID of the cloud cell 510.

The slave BS 120 or 125 that received the uplink control signal from the MS 100 forwards information on the received uplink control signal to the master BS 110 such that the information is exchanged between the master BS 110 and the slave BS 120 or 125 in step 335. One of the slave BSs 120 and 125 optionally forwards the uplink control signal to the other in step 335a, if the one has been changed to be a new master BS.

The slave BS 120 or 125 can know of information (e.g., an ID) about the master BS to which to forward the uplink control signal by using the ID of the master BS or the ID of the cloud cell (or information to estimate the ID of the master BS or the ID of the cloud cell) included in the uplink control signal received from the MS 100, and thus forward the information to the master BS 110.

The slave BS 120 or 125 can also provide information based on which the master BS 110 can determine priorities between slave BSs 120 and 125 that receives the uplink control signal from the MS 100. The information used to determine such priorities can be information on received signals, such as terminal ID, frequency/time offset, received signal strength, and the like.

If the master BS 110 that received the information from the slave BSs 120 and 125 determines that the master BS 110 is unable to provide the uplink control channel to the MS 100 or that it is more efficient for the slave BS 120 or 125 to provide the uplink control channel to the MS 100, the master BS 110 transmits a control transfer signal to any of the slave BS 120 or 125 that receives a best signal (or in the best condition) in step 340. Then, the slave BS that receives the control transfer signal can operate as the new master BS, or can be temporarily responsible only for the uplink control signal received from the terminal 100 in step 330. In the embodiment as illustrated in FIG. 3, the master BS 110 transmits the control transfer signal to the first slave BS 120.

In step 350, the first slave BS 120 transmits to the MS 100 an uplink control response signal (e.g., a BW-REQ response signal) for the uplink control signal received from the MS 100 in step 330. In this regard, the first slave BS 120 sends a signal in a frame that allows the MS 100 to receive the signal from the first slave BS 120, using the frame information to establish relationship of the MS 100 with the master BS 110 and slave BSs 120 and 125 for each receive frame of a signal received by the MS 100. The frame information can be delivered from the master BS 110 to the first slave BS 120 during an operation of determining the uplink coordinated control channel between the master MS 110 and the slave BS 120 or 125. Specifically, referring to FIG. 4, the frame information can indicate what base station is assigned to each of a plurality of frames for a terminal (or MS).

Additionally, if transmission of an uplink additional control signal (e.g., BW-REQ header signal) is demanded, the MS 100 can transmit the uplink additional control signal to the first slave BS 120 in step 355. For example, in an Institute of Electrical and Electronics Engineers (IEEE) 802.16m system, the uplink additional control signal can be sent to support Continuous mode. The uplink additional control signal to be transmitted by the MS 100 can include not only the ID of the MS 520 but also the ID of the master BS 500 of the MS 100 or the ID of the cloud cell 510 that the MS 100 belongs to. The ID of the master BS 500 can be an ID of the master BS 110 only when the slave BS 120 temporarily serves the control signal, or can be an ID of the slave BS 120 when the slave BS 120 has changed to be a new master BS.

Additionally, the MS 100 can receive an uplink additional control response signal from the first slave BS 120 in response to the additional control signal in step 360.

Figure 6:
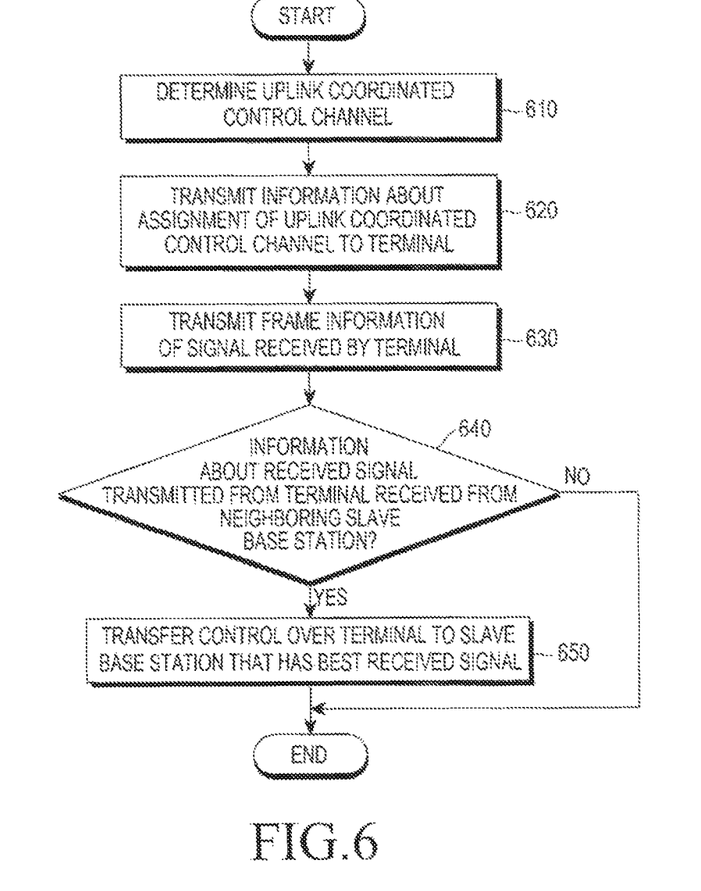
FIG. 6 is a flowchart illustrating operations of a master base station according to an embodiment of the present disclosure.

FIG. 6 is a flowchart of operations of the master BS 110, according to an embodiment of the present disclosure.

Referring to FIG. 6, the master BS 110 determines an uplink coordinated control channel through cooperation with neighboring slave BSs 120 and 125 in case of occurrence of communication interruption between the MS 100 and the master BS 110 in step 610, and transmits information on assignment of the uplink coordinated control channel to the MS 100 in step 620. In order for the MS 100 to receive signals not only from the master BS 110 but also from slave BSs 120 and 125 after the MS 100 transmits signals through the uplink coordinated control channel, the master BS 110 transmits to the MS 100 frame information to establish relationships of the MS 100 with the master BS 110 and slave BSs 120 and 125 for each receive frame of a signal that the MS 100 receives in step 630.

After that, if signal transmission between the MS 100 and the master BS 110 has failed and thus information on a signal transmitted through the uplink coordinated control channel is forwarded from the neighboring slaves BSs 120 and 125 to the master BS 110 in step 640, the master BS 110 determines that communication with the MS 100 is not being performed well and transfers the control over the MS 100 to any slave BS that has a best received signal among the neighboring slaves BSs 120 and 125 in step 650.

Figure 7:
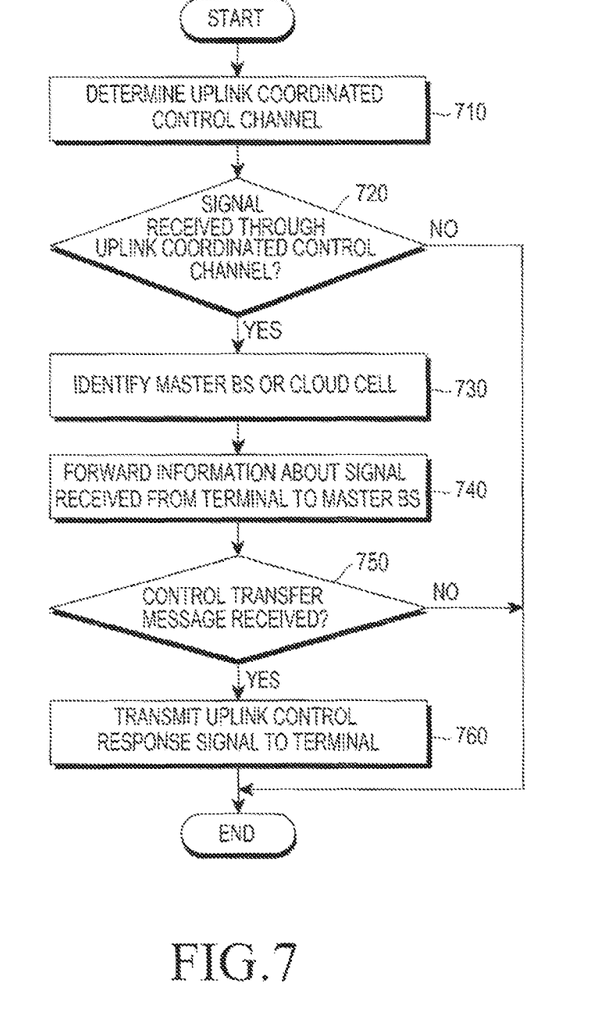
FIG. 7 is a flowchart illustrating operations of a slave base station according to an embodiment of the present disclosure.

FIG. 7 is a flowchart of operations of the slave BS 120, according to an embodiment of the present disclosure. It should be appreciated that the embodiment can also be applied to other slave BSs, such as the slave BS 125.

Referring to FIG. 7, the slave BS 120 determines an uplink coordinated control channel through cooperation with the master BS 110 and the other slave BS 125 in step 710 in case of occurrence of communication interruption between the MS 100 and the master BS 110. In the cooperation process of determining the uplink coordinated control channel, the slave BS 120 can receive from the master BS 110 frame information to establish relationships of the MS 100 with the master BS 110 and slave BSs 120 and 125 for each receive frame of a signal that the MS 100 receives. Upon reception of a signal through the uplink coordinated control channel from the MS 100 in step 720, the slave BS 120 decodes the signal and identifies an ID of the master BS 110 or an ID of the cloud cell in step 730, and forwards reception information, such as ID of a receiving terminal, time/frequency offset, received signal strength, and the like to the master BS 110 in step 740. Subsequently, upon reception of a control transfer message from the master BS 110 in step 750, the slave BS 120 transmits an uplink control response signal to the MS 100 using the frame information in step 760. Since the MS 100 may know when to receive a signal from the slave BS 120 based on the frame information, the slave BS 120 transmits the uplink control response signal by carrying the uplink control response signal on the signal to be received by the MS 100 at a time the MS 100 may know.

Figure 8:
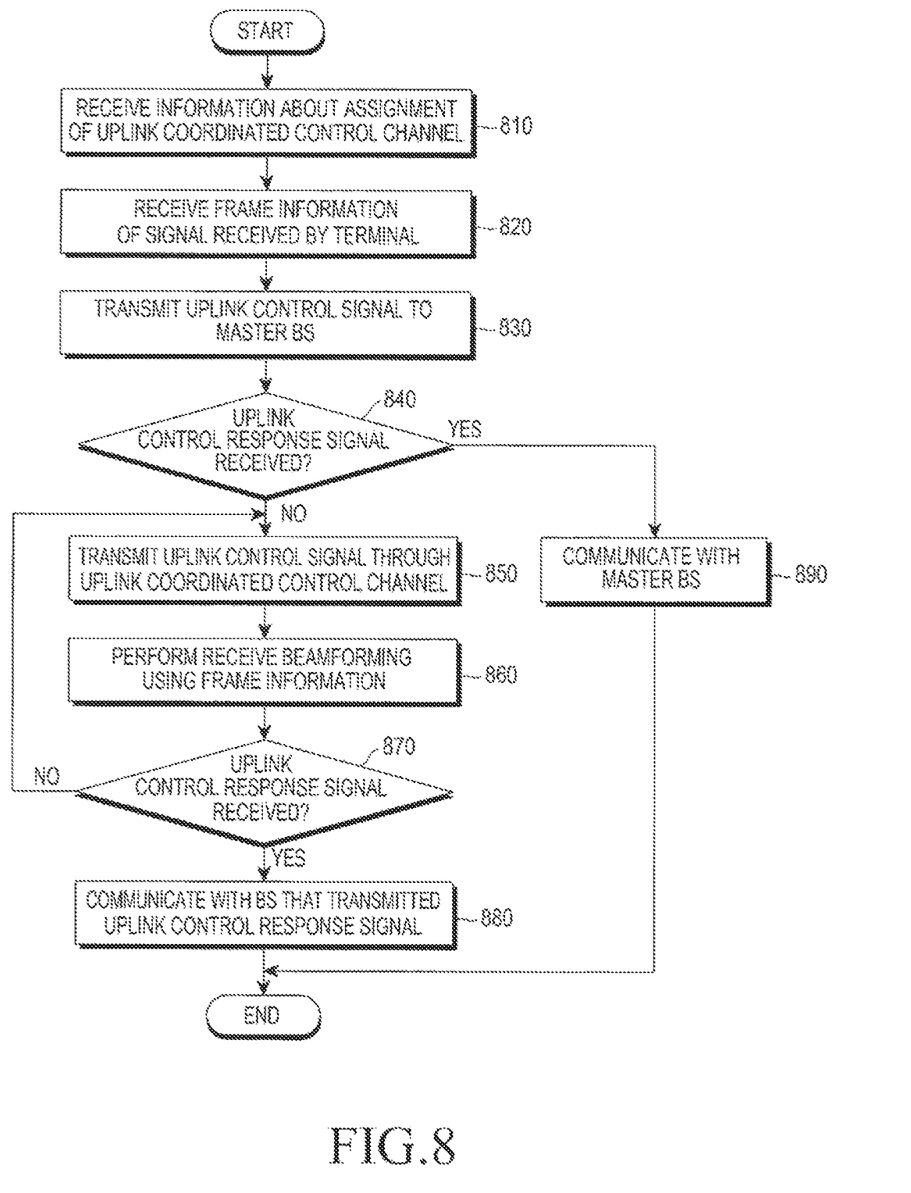
FIG. 8 is a flowchart illustrating operations of a terminal according to an embodiment of the present disclosure.

FIG. 8 is a flowchart of operations of the MS 100, according to an embodiment of the present disclosure.

Referring to FIG. 8, the MS 100 receives from the master BS 110 information on assignment of the uplink coordinated control channel determined in case of occurrence of communication interruption between the MS 100 and the master BS 110 in step 810. The MS 100 receives frame information to establish relationship of the MS 100 with the master BS 110 and slave BSs 120 and 125 for each receive frame of a signal that the MS 100 receives from the base stations 110, 120, and 125 in step 820. Then, after transmitting an uplink control signal to the master BS 110 in step 830, if the MS 100 has not received an uplink control response signal from the master BS 110 in a certain period of time in step 840, the MS 100 transmits the uplink control signal through an uplink coordinated control channel in step 850. In step 830, the MS 100 forms a transmit beam only in a direction toward the master MS 110 to transmit the control signal in step 830, but in step 850, the MS 100 can form transmit beams in directions toward the master BS 110 and the slave BSs 120 and 125 to transmit the control signal or can form transmit beams in all directions to transmit the control signal.

In step 860, the MS 100 performs receive beamforming for each base station, using the frame information received from the master BS 110 in step 820. If the MS 100 has received an uplink control response signal in step 870, the MS 100 performs communication under control of the base station that transmitted the uplink control response signal in step 880. If the MS 100 has not received an uplink control response signal in step 870, the MS 100 retries to transmit the uplink control signal through the uplink coordinated control channel to receive an uplink control response signal from the master BS 110 or the slave BSs 120 and 125 in step 850.

In the case the MS 100 has received an uplink control response signal in step 840, the MS 100 communicates with the master BS 110 in step 890.

In the embodiments, the base stations (BSs) and the terminal (MS) can each include transceiver for transmitting and receiving signals, and a controller for controlling operations of the BS or the MS.

Figure 9:
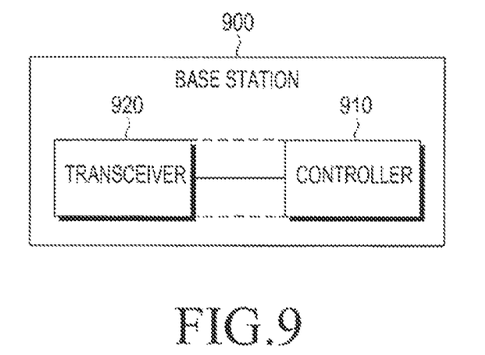
FIG. 9 is a schematic block diagram of a base station according to an embodiment of the present disclosure.

FIG. 9 is a block diagram of a base station, according to an embodiment of the present disclosure.

A base station 900 can include a transceiver 920 for transmitting and receiving different kinds of data and control signals, and a controller 910 for controlling operations of the transceiver 920 and controlling the base station 900 to operate as the foregoing master BS 110 or any of the slave BSs 120 and 125.

Specifically, the transceiver 920 can include an antenna unit (not shown) that has a plurality of array elements for transmitting and receiving RF signals, a beamforming unit (not shown) that performs beamforming on the signals, a modem (not shown) that performs signal reconstruction, modulation/demodulation, coding/decoding, and the like, and one or more RF chains (not shown) that performs conversion on a received RF signal and a basedband digital signal for signal delivery between the beamforming unit and the modem unit. The transceiver 920 and the controller 910 can be implemented separately as an Radio Frequency (RF) module and a processor, respectively, or can be incorporated in a single module.

Figure 10:
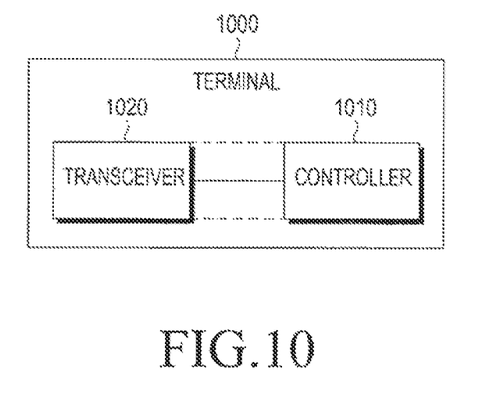
FIG. 10 is a schematic block diagram of a terminal according to an embodiment of the present disclosure.

FIG. 10 is a block diagram of a terminal, according to an embodiment of the present disclosure.

A terminal 1000 can include a transceiver 1020 for transmitting and receiving different kinds of data and control signals, and a controller 1010 for controlling operations of the transceiver 1020 and controlling the terminal 1000 to operate as the foregoing MS 100. Details of the transceiver 1020 of the terminal 1000 can be similar to those of the transceiver 920 of the BS 900, or can only include part of components of the transceiver 920 due to its hardware constraint. The transceiver 1020 and the controller 1010 can be implemented separately as a Radio Frequency (RF) module and a processor, respectively, or can be incorporated in a single module.

The foregoing operations can be implemented by program codes stored in a storage equipped in the BS 700 or the terminal 800. In other words, the controller 710 or 810 can perform the foregoing operations by reading out and executing the program codes with a processor or the Central Processing Unit (CPU).

Various components and modules of the BS 700 and the terminal 800 can be implemented in hardware, such as Complementary Metal Oxide Semiconductor (CMOS)-based logic circuits, firmware, software, or a combination thereof. For example, they can be practiced using electrical circuits, such as transistors, logic gates, and Application Specific Integrated Circuits (ASICs).

According to the embodiments of the present disclosure, coordinated communication between base stations allows a base station to take over another base station for controlling a terminal, thereby increasing communication efficiency and reliability.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of supporting communication of a terminal by a first base station of a beamforming system, the method comprising:
    determining an uplink control channel through which both the first base station and at least one second base station are able to receive signals, through cooperation with the at least one second base station, the first base station and the at least one second base station belonging to a cloud cell; and
    transmitting, to the terminal, information on the determined uplink control channel and frame information to establish relationships with the base stations included in the cloud cell for each transmit frame of a signal to be transmitted to the terminal from the base stations.

2. The method of claim 1, further comprising:
    receiving information on a signal that the at least one second base station received from the terminal through the uplink control channel from the at least one second base station.

3. The method of claim 2, further comprising:
    transmitting a control transfer signal for transferring control over the terminal to one of the at least one second base station that is configured to receive a best signal from the terminal, using the information on the received signal.

4. The method of claim 2, wherein the signal that the at least one second base station received from the terminal through the uplink control channel comprises an identity (ID) of the cloud cell or an ID of the first base station.

5. A method of supporting communication of a terminal by a first base station of a beamforming system, the method comprising:
    determining an uplink control channel through which both the first base station and a second base station are able to receive signals, through cooperation with the second base station, the first base station and the second base station belonging to a cloud cell;
    receiving from the second base station frame information to establish relationships with the base stations included in the cloud cell for each transmit frame of a signal to be transmitted to the terminal from the base stations; and
    receiving a signal from the terminal through the determined uplink control channel.

6. The method of claim 5, further comprising:
    transmitting information on the signal received from the terminal through the uplink control channel to the second base station.

7. The method of claim 6, further comprising:
    receiving a control transfer signal for transferring control over the terminal from the second base station.

8. The method of claim 7, further comprising:
    transmitting information in a transmit frame assigned to the first base station to the terminal, using the frame information.

9. The method of claim 6, wherein the signal received from the terminal comprises an ID of the cloud cell or an ID of the second base station.

10. A method of operating a terminal of a beamforming system, the method comprising:
    receiving information on an uplink control channel through which both a first base station and at least one second base station are able to receive signals, and which is determined through cooperation of the first base station and the at least one second base station, and frame information to establish relationships with the base stations for each receive frame of a signal to be received from any of the base stations, wherein the first base station and the at least one second base station belonging to a cloud cell.

11. The communication method of claim 10, further comprising:
    transmitting a signal through the uplink control channel; and
    receiving a response signal from any of the first base station and the at least one second base station by performing beamforming for the base stations using the frame information.

12. The communication method of claim 11, wherein transmitting a signal through the uplink control channel comprises transmitting signals in a transmit beamforming direction toward the first base station and the at least one second base station, or in all transmit beamforming directions available to the terminal.

13. The communication method of claim 10, further comprising:
    receiving information on an uplink control channel through which only the first base station is able to receive signals, which is determined only by the first base station; and
    transmitting a signal through the uplink control channel through which only the first base station is able to receive signals only in a transmit beamforming direction toward the first base station.

14. The communication method of claim 11, wherein the signal to be transmitted through the uplink control channel comprises an ID of the cloud cell or an ID of the first base station.

15. A first base station for supporting communication of a terminal in a beamforming system, the first base station comprising:
    a transceiver configured to transmit or receive signals; and
    a controller configured to determine an uplink control channel through which both the first base station and at least one second base station are able to receive signals, through cooperation with the at least one second base station, the first base station and the at least one second base station belonging to a cloud cell; and transmit to the terminal information on the determined uplink control channel and frame information to establish relationships with the base stations included in the cloud cell for each transmit frame of a signal to be transmitted to the terminal from the base stations.

16. The first base station of claim 15, wherein the controller is, upon reception of information on a signal received from the terminal through the uplink control channel from the at least one second base station, configured to control the transceiver to transmit a control transfer signal for transferring control over the terminal to one of the at least one second base station configured to receive a best signal from the terminal.

17. The first base station of claim 16, wherein the signal that the at least one second base station is configured to receive from the terminal through the uplink control channel comprises an identity (ID) of the cloud cell or an ID of the first base station.

18. A first base station for supporting communication of a terminal in a beamforming system, the first base station comprising:
a transceiver configured to transmit or receive signals; and
a controller configured to determine an uplink control channel through which both the first base station and at least one second base station are able to receive signals, through cooperation with the at least one second base station, the first base station and the at least one second base station belonging to a cloud cell; and control the transceiver to receive, from the at least one second base station, frame information to establish relationships with the base stations of the cloud cell for each transmit frame of a signal to be transmitted to the terminal from the base stations, and to receive signals from the terminal through the uplink control channel.

19. The first base station of claim 18, wherein the controller is configured to control the transceiver to transmit information on the signal received from the terminal through the uplink control channel to the second base station.

20. The first base station of claim 18, wherein the controller is configured to control the transceiver to receive a control transfer signal for transferring control over the terminal from the second base station.

21. The first base station of claim 18, wherein the controller is configured to control the transceiver to transmit information in a transmit frame assigned to the first base station to the terminal, using the frame information.

22. The first base station of claim 18, wherein the signal received from the terminal comprises an ID of the cloud cell or an ID of the second base station.

23. A communication terminal in a beamforming system, the terminal comprising:
a transceiver configured to transmit or receive signals; and
a controller configured to control the transceiver to receive information on an uplink control channel through which both a first base station and at least one second base station are able to receive signals, and which is determined through cooperation of the first base station and the at least one second base station, and further receive frame information to establish relationships with the base stations for each receive frame of a signal to be received from any of the base stations,
wherein the first base station and the at least one second base station belongs to a cloud cell.

24. The terminal of claim 23, wherein the controller is configured to control the transceiver to transmit a signal through the uplink control channel and to receive a response signal from any of the first base station and the at least one second base station by performing beamforming for the base stations using the frame information.

25. The terminal of claim 24, wherein the signal to be transmitted through the uplink control channel comprises an ID of the cloud cell or an ID of the first base station.

26. The terminal of claim 24, wherein the controller is configured to control the transceiver to transmit a signal through the uplink control channel in transmit beamforming directions toward the first base station and the at least one second base station or in all available transmit beamforming directions.

27. The terminal of claim 23, wherein the controller is configured to control the transceiver to further receive information on an uplink control channel through which only the first base station is able to receive signals, which is determined only by the first base station; and control the transceiver to transmit a signal through the uplink control channel only available to the first base station only in a transmit beamforming direction toward the first base station.

* * * * *